(12) United States Patent
Jang et al.

(10) Patent No.: US 10,992,634 B2
(45) Date of Patent: Apr. 27, 2021

(54) MESSAGE SERVER AND MESSAGE PROCESSING APPARATUS FOR RELAYING APPLICATION SERVICE MESSAGE

(71) Applicant: SAMSUNG SDS CO., LTD., Seoul (KR)

(72) Inventors: Eun-su Jang, Seoul (KR); Kyung-Rae Jang, Seoul (KR); Min-Jung Choi, Seoul (KR); Min-kyu Jung, Seoul (KR); Ha-Jin Park, Seoul (KR); Hyo-Joong Lee, Seoul (KR); Hyun-Myung Jung, Seoul (KR); Se-Hyuk Noh, Seoul (KR); Soon-Hyoung Hwang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 127 days.

(21) Appl. No.: 16/365,914

(22) Filed: Mar. 27, 2019

(65) Prior Publication Data
US 2019/0312835 A1    Oct. 10, 2019

(30) Foreign Application Priority Data

Apr. 6, 2018    (KR) .................. 10-2018-0040552

(51) Int. Cl.
*G06F 15/16*    (2006.01)
*H04L 12/58*    (2006.01)
*H04L 29/08*    (2006.01)

(52) U.S. Cl.
CPC ............ *H04L 51/36* (2013.01); *H04L 67/20* (2013.01); *H04L 67/2823* (2013.01)

(58) Field of Classification Search
CPC ..... H04L 51/36; H04L 67/20; H04L 67/2823; H04L 67/327; H04L 67/101
USPC .......................................................... 709/206
See application file for complete search history.

(56) References Cited

U.S. PATENT DOCUMENTS

| | | | | |
|---|---|---|---|---|
| 9,037,118 B2* | 5/2015 | Gaddam | ................ | H04L 67/26 455/414.1 |
| 9,148,460 B1* | 9/2015 | Sun | ...................... | H04L 63/0815 |
| 9,270,719 B2* | 2/2016 | Chan | ...................... | G06F 16/93 |
| 10,212,192 B2* | 2/2019 | Wallis | ..................... | H04L 67/26 |
| 2011/0029598 A1* | 2/2011 | Arnold | ..................... | H04L 67/26 709/203 |
| 2013/0084896 A1* | 4/2013 | Barkie | .................. | H04W 12/10 455/466 |
| 2014/0007213 A1* | 1/2014 | Sanin | ..................... | H04L 63/083 726/9 |
| 2014/0095660 A1* | 4/2014 | Chan | ................... | H04L 67/1095 709/217 |
| 2015/0026324 A1* | 1/2015 | Rheinheimer | ...... | H04L 41/0604 709/223 |
| 2015/0081817 A1* | 3/2015 | Jeon | ........................ | H04L 69/40 709/206 |

(Continued)

Primary Examiner — Normin Abedin
(74) Attorney, Agent, or Firm — Sughrue Mion, PLLC

(57) ABSTRACT

A message server and a message processing apparatus including the same are provided. According to the embodiments of the present disclosure, when the device management module is not available to be used, a message is directly delivered to the application client through the third party message server so that the reliability of the message forwarded between a sender side and a receiver side can be ensured.

8 Claims, 12 Drawing Sheets

(56) References Cited

U.S. PATENT DOCUMENTS

2016/0156782 A1\* 6/2016 Mumick ................. H04W 4/14
                                                       455/413
2016/0241659 A1\* 8/2016 Wessendorf ............ H04L 67/26
2018/0198830 A1\* 7/2018 Wallis ................. H04L 65/1006

\* cited by examiner

FIG. 6

| Tag | APNS | GCM | WNS |
|---|---|---|---|
| Source Information | Certificate | ID | SID |
| | Password | Password | Password |
| Target | Token | Registration ID | URI |
| Title | ○ | ○ | ○ |
| SubTitle | | ○ | |
| Ticker | | ○ | ○ |
| Badge | ○ | | ○ |
| Sound | ○ | | |
| Data | ○ | ○ | ○ |

FIG. 10

|  | Trigger | Functionality | |
|---|---|---|---|
| Normal mode | Plug-in<br>Using(sensor, screen on) | CPU | ◯ |
| | | Network | ◯ |
| | | Timer(alarm) | ◯ |
| Doze mode | unPlug-in<br>Not Using<br>(more than 50min)<br>Screen off | CPU | ◯ |
| | | Network | ✗ |
| | | Timer(alarm) | ✗ |

MESSAGE SERVER AND MESSAGE PROCESSING APPARATUS FOR RELAYING APPLICATION SERVICE MESSAGE

CROSS-REFERENCE TO RELATED APPLICATION(S)

This application claims the benefit under 35 USC § 119(a) of Korean Patent Application No. 10-2018-0040552, filed on Apr. 6, 2018, in the Korean Intellectual Property Office, the entire disclosure of which is incorporated herein by reference for all purposes.

BACKGROUND

1. Field

The following description relates to a message processing apparatus, and more particularly, to a technology for processing a message related to an application service.

2. Description of Related Art

Recently, as mobile terminals are widely used and information communication technology is developed, there is an increasing demand for a message processing system that provides various message services. The message processing system is applicable to various fields, such as security services, email services, payment services, and the like. In the message processing system, various messages related to services provided by the message processing system are transmitted and received between a sender side and a receiver side. At this time, the message processing system needs to ensure the reliability of the message transmitted between the sender side and the receiver side in order to maintain the continuity of the service and protect the system against external attack.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a message processing apparatus for improving the reliability of a message transmitted between a sender side and a receiver side, in cooperation with a third party message server.

In one general aspect, there is provided a message processing apparatus including a service management module residing on a side of an application server, a device management module residing on a side of an application client, and a message server which is configured to relay a message related to an application service between the service management module and the device management module and is connected to one or more third party message servers, wherein the message server includes a plurality of service channel managers configured to relay the message on a side of the service management module, a plurality of device channel managers configured to relay the message on a side of the device management module, and an external channel manager configured to convert the message into a third party message in a form capable of being processed by the third party message server and relay the third party message between the message server and a gateway connected to the third party message server.

The third party message server may receive the third party message from the external channel manager and forward the third party message to the application client through the device management module.

The gateway may determine a third party message server to which the third party message is forwarded among the one or more third party message servers according to a type of the third party message.

The third party message servers may receive the third party message from the external channel manager and directly forward the third party message to the application client without going through the device management module.

The device channel manager may transmit a wake-up signal to the external channel manager when it is determined that a connection to the device management module is disconnected, the third party message server may receive the wake-up signal from the external channel manager and transmit the wake-up signal to the device management module, and the device management module may attempt reconnection to the device channel manager in response to receiving the wake-up signal.

The service management module may generate the message and a notification signal including additional information related to the message and transmit the message and the notification signal to the service channel manager, the service channel manager may transmit the message and the notification signal to the device channel manager and the external channel manager, respectively, the third party message server may receive the notification signal from the external channel manager and forward the notification signal to the device management module, and the device management module may be connected to the device channel manager by being executed by a user in response to the notification signal and may receive the message from the device channel manager.

In another general aspect, there is provided a message server which relays a message related to an application service between a service management module residing on an application server side and a device management module residing on an application client side and is connected to one or more third party message servers, the message server including a plurality of service channel managers configured to relay the message on a side of the service management module, a plurality of device channel managers configured to relay the message on a side of the device management module, and an external channel manager configured to convert the message into a third party message in a form capable of being processed by the third party message server and relay the third party message between the message server and a gateway connected to the third party message server.

Other features and aspects will be apparent from the following detailed description, the drawings, and the claims.

BRIEF DESCRIPTION OF THE DRAWINGS

FIG. 6 is a table showing examples of a variety of information included in a third party message according to one embodiment of the present disclosure.

FIG. 10 is a table for describing doze mode according to one embodiment of the present disclosure.

Figure 1:
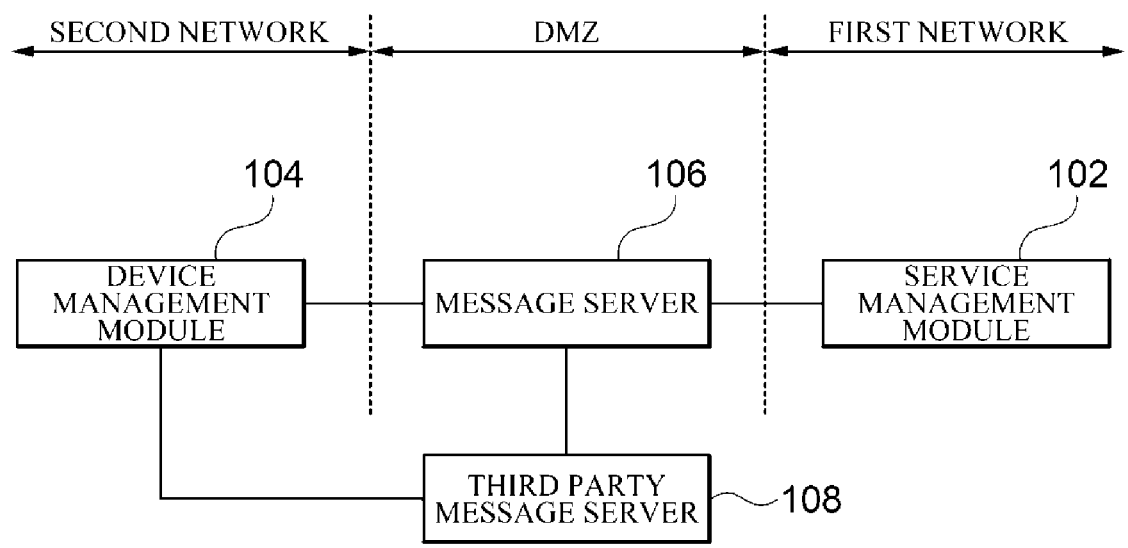
FIG. 1 is a block diagram illustrating a detailed configuration of a message processing apparatus according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram illustrating a detailed configuration of a message processing apparatus according to one embodiment of the present disclosure. As shown in FIG. 1, the message processing apparatus 100 according to one embodiment of the present disclosure includes a service management module 102, a device management module 104, a message server 106, and a third party message server 108.

The service management module 102 is a component on an application server (not shown) and transmits and receives various messages related to an application service between the application server and the message server 106. In embodiments of the present disclosure, the application server is a server for providing an application service to a device (not shown). The application service may be, for example, a security-related service, such as a control of a camera of the device, a microphone control, and a recording function control, but this is merely an example, and the application service is not particularly limited. In addition, the messages may be, for example, a control message for executing the application service on the device, a reception acknowledgement message (i.e., an ACK message) for the control message, and the like.

The service management module 102 may provide reliability for message transmission to the application server by transmitting and receiving the messages between the application server and a service channel management unit, which will be described below. In addition, the service management module 102 may perform additional functions, such as transmission and reception of a reception acknowledgement message (i.e., an ACK message), cancellation of message transmission, conversion of a user ID into an ID of the device management module, authentication information management for security, processing of multicast transmission request, and the like.

There may be a plurality of service management modules 102, and each service management module 102 may have a different ID (i.e., an instance ID). In addition, the service management modules 102 that process the same application service may belong to the same group and have the same group ID. Further, the service management module 102 and the application server may be located at a first network. In the present embodiments, the first network may be, for example, an intranet of a specific organization or an enterprise. The service management module 102 may generate a message related to an application service in response to a request from the application server and transmit the message to the message server 106. In addition, the service management module 102 may receive the message transmitted from the device management module 104 through the message server 106.

The device management module 104, which is a component on a device side, transmits and receives various messages related to the application service between an application client (not shown) and the message server 106. In embodiments of the present disclosure, the device may be a terminal carried by the user and may be a mobile terminal, such as a smartphone, a notebook personal computer (PC), a tablet PC, or the like. In addition, the application client is a module installed in the device to allow the application service provided by the application server to run on the device. The device management module 104 may transmit and receive messages between the application client and a device channel manager, which will be described below. In addition, the device management module 104 may perform additional functions, such as transmission and reception of a reception acknowledgement message (i.e., an ACK message), cancellation of message transmission, authentication information management for security, and the like.

There may be one or more device management modules 104 in each device and each of the device management modules 104 may have a different ID. The device may be allocated an ID of a corresponding device management module 104 by the message server 106 in the process of activating the device management module 104 for the first time. In addition, the device management module 104 and the device in which the device management module 104 is installed may be located in a second network. In embodiments of the present disclosure, the second network may be an external area of the first network and may be, for example, the Internet. The device management module 104 may generate a message related to the application service in response to a request of the application client 302 and transmit the message to the message server 106. Also, the device management module 104 may receive a message transmitted from the service management module 102 through the message server 106.

The message server 106 is a server which relays the application service-related messages between the service management module 102 and the device management module 104. In this case, the message server 106 may be located in a demilitarized zone (DMZ) between the first network and the second network. The DMZ may be a sub-network interposed between the first network and the second network and there may be a firewall between the first network and the DMZ.

The message server 106 may include various channel managers for message relaying, and may route the message through the channel manager. The detailed configuration and function of the message server 106 will be described in detail below with reference to FIG. 4.

The third party message server 108 may be a message server of another organization or enterprise and may be a message server (or a push server) of, for example, Google cloud messaging (GCM), Apple push notification service (APNS), or Windows push notification service (WNS). As described below, the message server 106 may transmit and receive the messages related to the application service to and from the third party message server 108 through a channel manager (i.e., an external channel manager which will be described below), which is included in the message server 106. In addition, as described below, the third party message server 108 may be usefully used for directly delivering a message to the application client in the case where the device management module 104 is not available, for waking up/executing the device management module 104, or for cancelling doze mode if the device enters into the doze mode.

Figure 2:
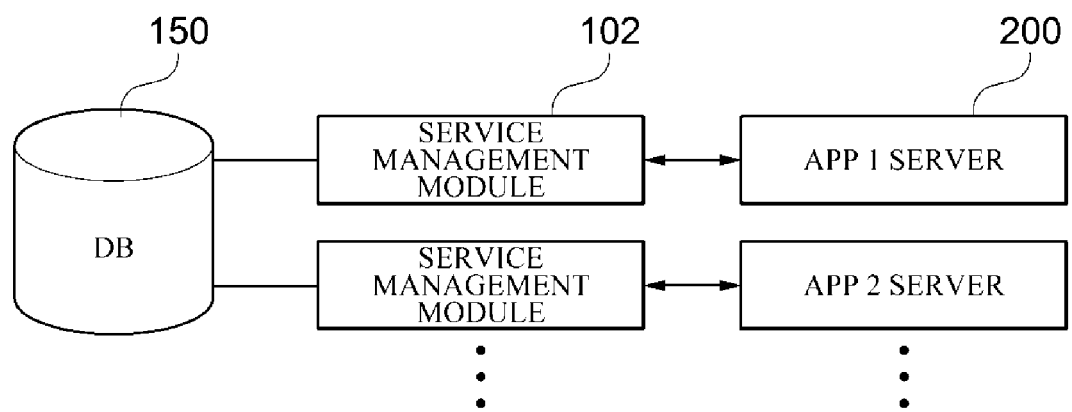
FIG. 2 is a diagram illustrating an example of a service management module and an application server according to one embodiment of the present disclosure.

FIG. 2 is a diagram illustrating an example of a service management module 102 and an application server 200 according to one embodiment of the present disclosure. Referring to FIG. 2, a plurality (e.g., 100) of service management modules 102 may exist for load distribution according to one embodiment of the present disclosure, and may bidirectionally communicate with the application server 200 by calling a function through a library (not shown). To this end, the service management module 102 may include an interface (not shown) for bidirectional communication with the application server 200. As described above, the service management module 102 may generate a message related to an application service in response to a request of the application server 200 and store the message in a database (DB) 150, and transmit the message to a device management module 104 through a message server 106. The DB 150 may be connected to each service management module 102 in a first network. In this case, the message may include a source address, a destination address, via information, data information (e.g., an application ID, an ID of a previously transmitted message, etc.) and the like. Here, the source address may include an ID of the service management module 102 which transmits the message, and the destination address may include an ID of the device management module 104 which is a destination of the message. The message server 106 may route the message using the source address, the destination information, and the via information which are included in the message and transmit the routed message to the device management module 104.

Figure 3:
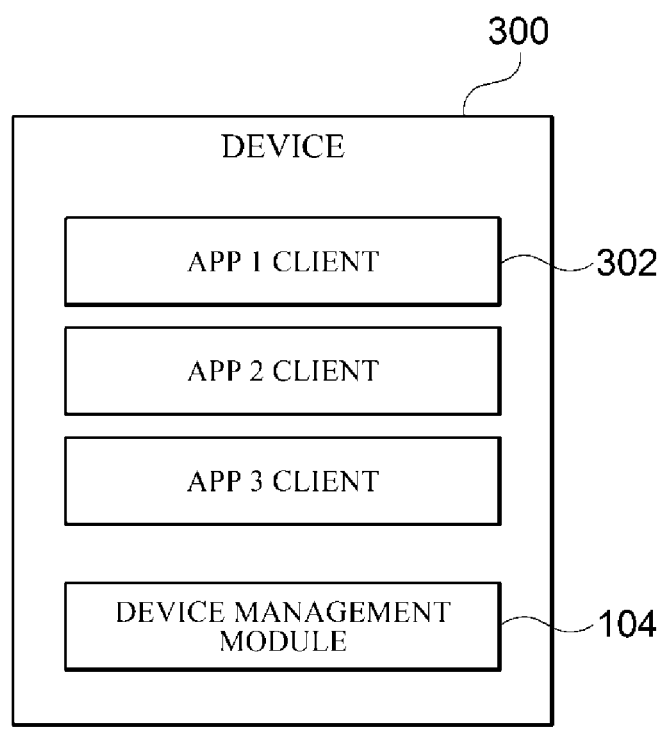
FIG. 3 is a diagram illustrating an example of a device management module and a device according to one embodiment of the present disclosure.

FIG. 3 is a diagram illustrating an example of a device management module 104 and a device 300 according to one embodiment of the present disclosure.

Referring to FIG. 3, the device management module 104 according to one embodiment of the present disclosure may be installed in the device 300 and may transmit and receive a message related to a corresponding application service to and from each application client. The device management module 104 may bidirectionally communicate with the application client 302 by calling a function through a library (not shown). To this end, the device management module 104 may include an interface (not shown) for bidirectional communication with the application client 302.

In addition, the device management module 104 may receive a message related to an application service from a service management module 102 through a message server 106 and transmit a reception acknowledgement message (i.e., an ACK message) to the service management module 102 through the message server 106.

Figure 4:
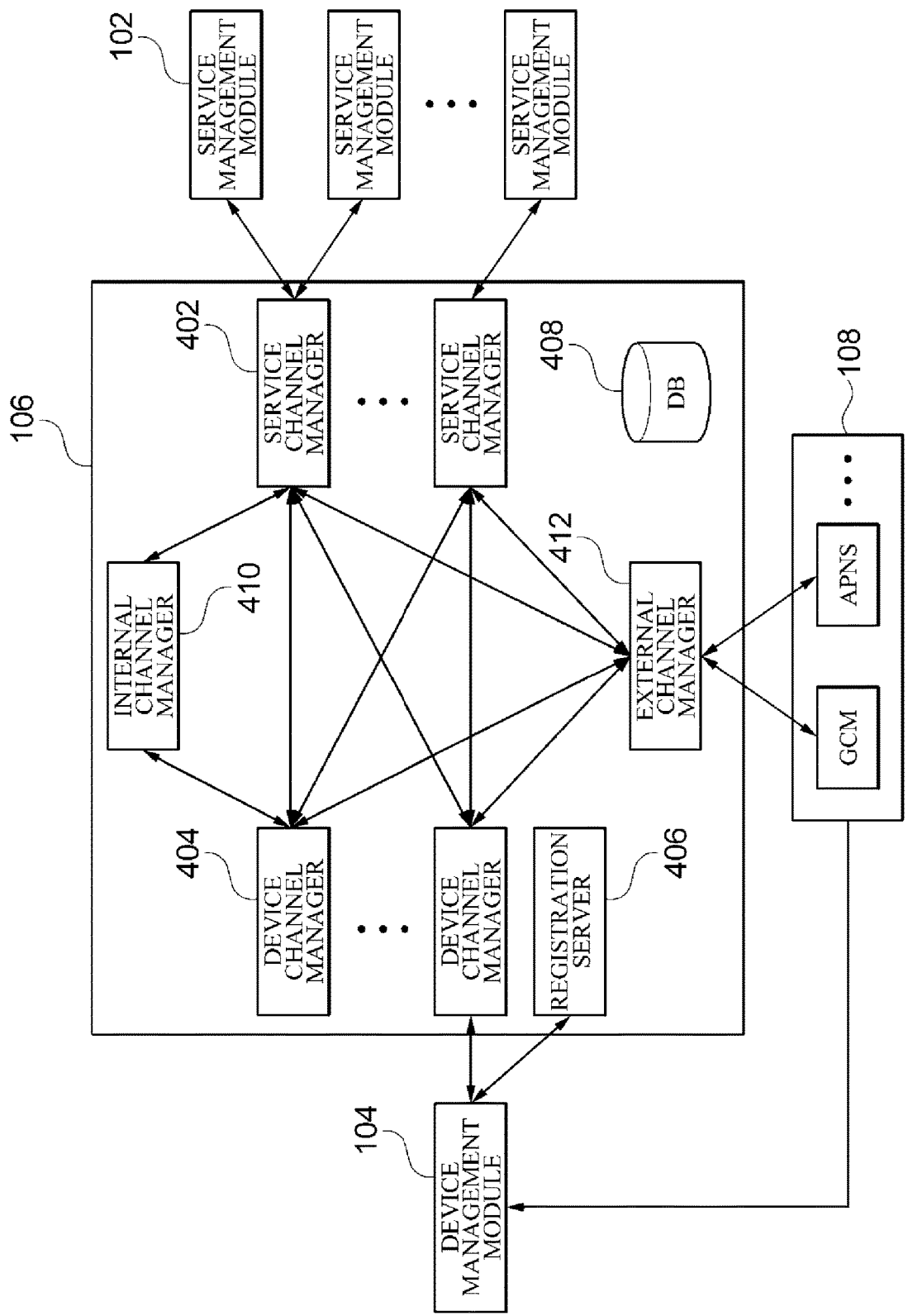
FIG. 4 is a block diagram illustrating a detailed configuration of a message server according to one embodiment of the present disclosure.

FIG. 4 is a block diagram illustrating a detailed configuration of a message server 106 according to one embodiment of the present disclosure. As shown in FIG. 4, the message server 106 according to one embodiment of the present disclosure includes a plurality of service channel managers 402, a plurality of device channel managers 404, a registration server 406, a DB 408, a plurality of internal channel managers 410, and an external channel manager 412.

The service channel manager 402 manages a channel for communication with a service management module 102 and relays application service-related messages on a side of the service management module 102. As shown in FIG. 4, each of the service channel managers 402 may be connected to a plurality of service management modules 102 in the form of a mesh.

Each of the service channel managers 402 may store and update first routing information in the DB 408 each time the service management module 102 is connected to the service channel manager 402. Here, the first routing information may include one or more of an ID of the service management module 102 that is connected to the service channel manager 402, an ID of a group to which the service management module 102 belongs, an ID of the service channel manager 402, and an ID of a channel between the service channel manager 402 and the service management module 102. In this case, APID or APIID may be mapped to the ID of the service management module included in the first routing information or the group ID of the service management module. The APID is an ID assigned to a group to which an application server 200 providing the same application service belongs and the APIID is an ID assigned to each of the application server 200 belonging to the same group.

The service channel manager 402 may receive a message from the service management module 102 and route the message by referring to the DB 408. As described above, the service management module 102 may generate the message in response to a request of the application server 200 and transmit the message to the service channel manager 402. In this case, the message may include a source address, a destination address, via information, data information (e.g., an application ID, an ID of a previously transmitted message, etc.), and the like. Here, the source address may include an ID of the service management module 102 which transmits the message, and the destination address may include an ID of the device management module 104 which is a destination of the message. As described below, the service channel manager 402 may route the message using the source information, destination information, via information, and the like, which are included in the message, and the first routing information or second routing information, which is stored in the DB 408.

The device channel manager 404 manages a channel for communication with the device management module 104 and relays application service-related messages on a side of the device management module 104. To this end, the device 300 may register the device and the device management module 104 installed in the device 400 in the registration server 406 in the process of initially activating the device management module 104 and may be assigned an ID of the device management module 104 from the registration server 406. In addition, the registration server 406 may assign a currently available device channel manager 404 among the plurality of device channel managers 404 to the device management module 104 and the device management module 104 may transmit and receive messages to and from the device channel manager 404 assigned thereto.

In this case, each of the device channel managers 404 may store and update second routing information in the DB 408 each time the device management module 104 is connected to the device channel manager 404. In this case, the second routing information may include one or more of an ID of the device management module 104 which is connected to the device channel manager 404, an ID of the device channel manager 404, an ID of a channel between the device channel manager 404 and the device management module 104, and information indicating a connection status of the device management module 104.

The device channel manager 404 may receive a message from the device management module 104 and route the message by referring to the DB 408. As described above, the device management module 104 may generate a message related to an application service in response to a request of an application client 302 and transmit the message to the device channel manager 404. In this case, the message may include a source address, a destination address, via information, data information (e.g., an application ID, an ID of a previously transmitted message, etc.) and the like. Here, the source address may include the ID of the device management module 104 that transmits the message and the destination address may include an ID of the service management module 102, which is a destination of the message, or an ID (APID or APIID) of the application service. As described below, the device channel manager 404 may route the message using the source information, destination information, and via information, which are included in the message, and the first routing information or the second routing information, which is stored in the DB 408. Meanwhile, the number of service channel managers 402 and the number of device channel manager 404 may vary depending on the number of the device management modules 104. For example, the number of the service channel manager 402 and the number of device channel manager 404 may increase as the number of device management modules 104 increases.

The registration server 406 manages information (e.g., an IP address, MAC address, or the like of the device 300) of the device 300 in which the device management module 104 is installed, and assigns one of the plurality of device channel managers 404 to the device management module 104. As described above, the device 300 may register the device 300 and the device management module 104 installed in the device 300 in the registration server 406 in the process of initially activating the device management module 104. Accordingly, the registration server 406 may assign a currently available device channel manager 404 among the plurality of device channel managers 404 to the device management module 104.

The DB 408 is a repository in which instance information and routing information are stored. The instance information may include pieces of information about each of components (the service channel manager, DC, the registration server, the internal channel manager, the external channel manager, and the like) inside the message server 106 and may include IDs of each of the components and IP/port information for transmitting a message to each component. The instance information may be updated when a corresponding component is activated or shutdown.

In addition, the routing information is information used in determining a component that processes a message related to the application service from among the components (the service channel manager, the device channel manager, the registration server, the internal channel manager, the external channel manager, etc.) inside the message server 106. As described above, each of the service channel managers 402 may store and update the first routing information in the DB 408 each time the service management module 102 is connected to the service channel manager 402, and each of the device channel managers 404 may store and update the second routing information in the DB 408 each time the device management module 104 is connected to the device channel manager 404.

In addition, a connection relationship and routing information among the service channel managers 402, the device channel managers 404, and the internal channel managers 410 and the external channel managers 412, which will be described below, may be stored in the DB 408.

Hereinafter, a routing method in each component inside the message processing apparatus 100 will be described in detail.

Routing in the Service Management Module 102

In a case in which the via information included in the message is an own ID (an ID of the service management module or a group ID of the service management module) and the destination address included in the message is an ID of the device management module 104, the service management module 102 may transmit the message to the service channel manager 402. In addition, in a case in which the via information included in the message is an own ID (an ID of the service management module or a group ID of the service management module) and the destination address included in the message is an APID or an APIID, the service management module 102 may transmit the message to the application server 200 that corresponds to the APID or APIID.

Routing in the Device Management Module 104

In a case in which the destination address included in the message is an own ID of the device management module 104, the device management module 104 may terminate routing and transmit the message to the application client 302 that corresponds to an APID included in the message. In other cases, the device management module 104 may forward the received message to the device channel manager 404 assigned by the registration server 406.

Routing in the Service Channel Manager 402

In a case in which the destination address included in the message is an APID or an APIID, the service channel manager 402 may find an ID (or an address) of the service management module 102 that corresponds to the APID or APIID by referring to the first routing information stored in the DB 408 and forward the message to the found service management module 102.

In addition, in a case in which the destination address included in the message is an ID of the device management module 104, the service channel manager 402 may find an ID (or an address) of the device channel manager 404 to which the device management module 104 is connected by referring to the second routing information stored in the DB 408 and forward the message to the found device channel manager 404. In this case, the service channel manager 402 may forward the message to the device channel manager 404 through a user device management module datagram protocol (UDP) channel.

Routing in the Device Channel Manager 404

In a case in which the destination address included in the message is the device management module 104, the device channel manager 404 may forward the message to the device management module 104.

In addition, in a case in which the destination address included in the message is an APID or an APIID, the device channel manager 404 may find the service management module 102 that corresponds to the APID or APIID and an ID (or an address) of the service channel manager 402 to which the service management module 102 is connected by referring to the first routing information stored in the DB 408 and forward the message to the found service channel manager 402. In this case, the device channel manager 404 may forward the message to the service channel manager 402 through an UDP channel.

As described above, the service channel manager 402 and the device channel manager 404 may relay the messages related to the application service using the first routing information and the second routing information, which are stored in the DB 408.

The internal channel managers 410 relay messages related to the application service between the service channel managers 402 and the device channel managers 404 in high security mode. Each of the internal channel managers 410 may be installed in different hardware and may be used to forward the message on the different hardware. Each of the internal channel managers 410 may be connected to each other through a transport layer security (TLS) channel and may transmit and receive the messages through the TLS channel.

The external channel manager 412 relays a message related to the application service between the message server 106 and a gateway (not shown) connected to the third party message server 108. In this case, the external channel manager 412 may convert the message into a third party message which is in the form that can be processed in the third party message server 108, and may relay the third party message between the message server 106 and the gateway. In addition, the external channel manager 412 may be connected to the service channel managers 402 and the device channel managers 404 through the UDP channel and may transmit and receive messages to and from the service channel managers 402 and the device channel managers 404.

Hereinafter, a process of forwarding a message using the external channel manager 412 and the third party message server 108 will be described in detail with reference to FIGS. 5 to 11.

Figure 5:
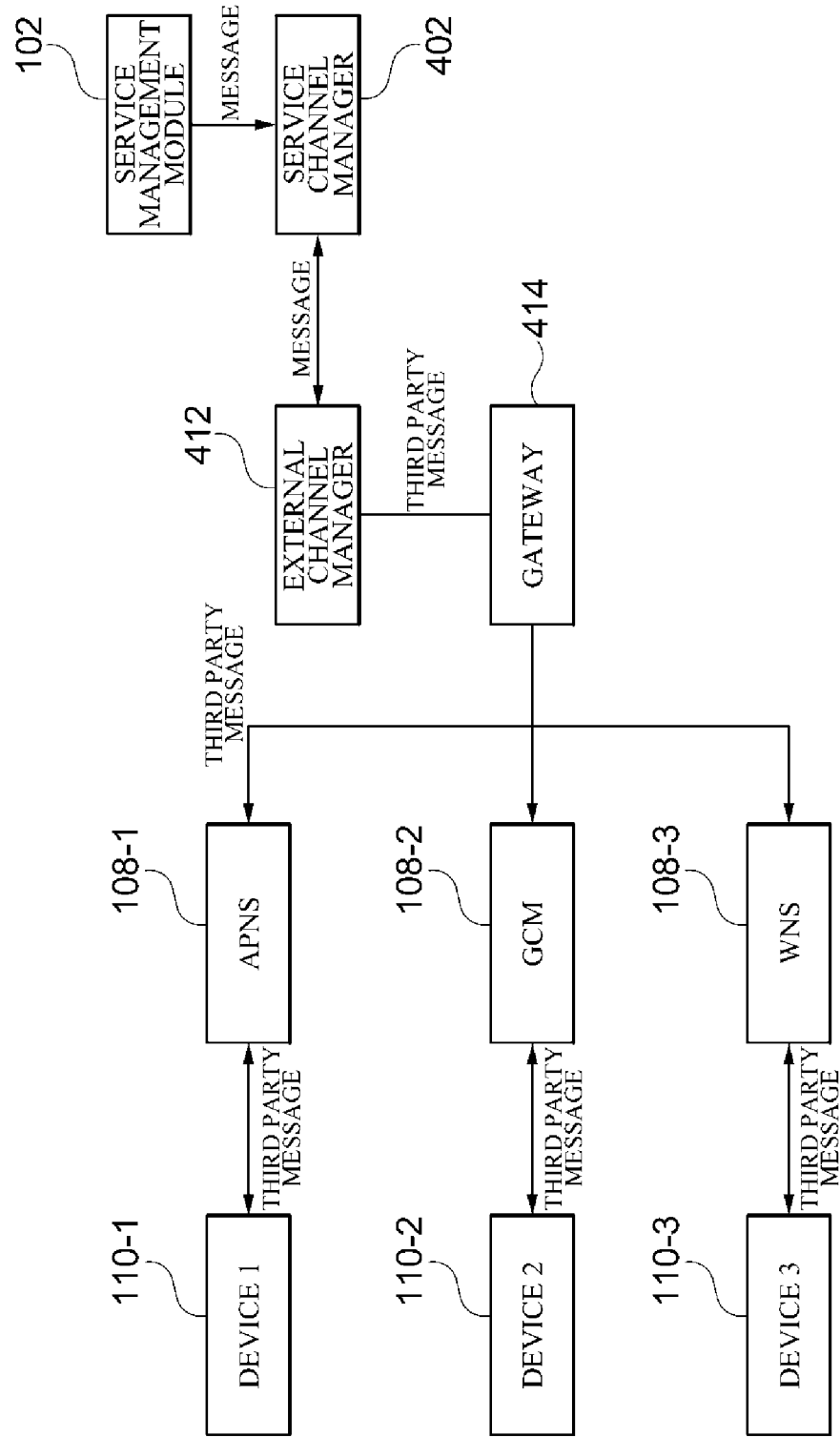
FIG. 5 is a diagram for describing a process of forwarding a message using a third party message server according to a first embodiment of the present disclosure.

FIG. 5 is a diagram for describing a process of forwarding a message using the third party message server 108 according to a first embodiment of the present disclosure.

Referring to FIG. 5, the third party message server 108 may include, for example, an APNS 108-1, a GCM 108-2, and an WNS 108-3, and these may be connected to device 1 110-1, device 2 110-2, and device 3 110-3, respectively.

The service management module 102 may generate a message in response to a message generation and transmission request of the application server and transmit the message to the service channel manager 402. In this case, the message may be a message related to an application service provided in connection with the third party message server 108, and the request may include an instruction to forward the message to the application client through the external channel manager 412, rather than through the device management channel manager 404. Accordingly, the external channel manager 412 may convert the message into a message form that can be processed by the corresponding third party message server 108. Hereinafter, the message converted as described above will be referred to as a "third party message." The external channel manager 412 may forward the third party message to a gateway 414 and the gateway 414 may confirm a type of the third party message and determine the third party message server 108 to which the third party message is transmitted. Then, the gateway 414 may forward the third party message to the third party message server 108 and the third party message server 108 may forward the message to the device 110. Meanwhile, the type of the third party message (or a type of information included in the third party message) may differ according to the corresponding third party message server 108.

FIG. 6 is a table showing examples of a variety of information included in the third party message according to one embodiment of the present disclosure.

Referring to FIG. 6, information included in the third party messages of the APNS 108-1, the GCM 108-2, and WNS 108-3 may differ from each other. In one example, a title (i.e. a title of a notification) is included in all of the third party messages of the APNS 108-1, the GCM 108-2, and WNS 108-3, but sub-title (i.e., a sub-title of a notification) is included only in the third party message of the GCM 108-2, and a ticker (i.e., text to be immediately displayed on a notification bar in the event of issuing the notification) is included only in the third party messages of the GCM 108-2 and the WNS 108-3. In addition, in the case of the APNS 108-1, an authentication method using a certificate and a password may be used, unlike the GCM 108-2 and the WNS 108-3. As described above, the type of the third party message may differ according to the corresponding third party message server 108. When the gateway 414 receives the third party message, the gateway 414 may confirm the type (or a form) of the third party message from the information included in the third party message and determine the third party message server 108 to which to forward the third party message. Meanwhile, the message type of each third party message shown in FIG. 6 is merely an example, and is not limited thereto.

Figure 7:
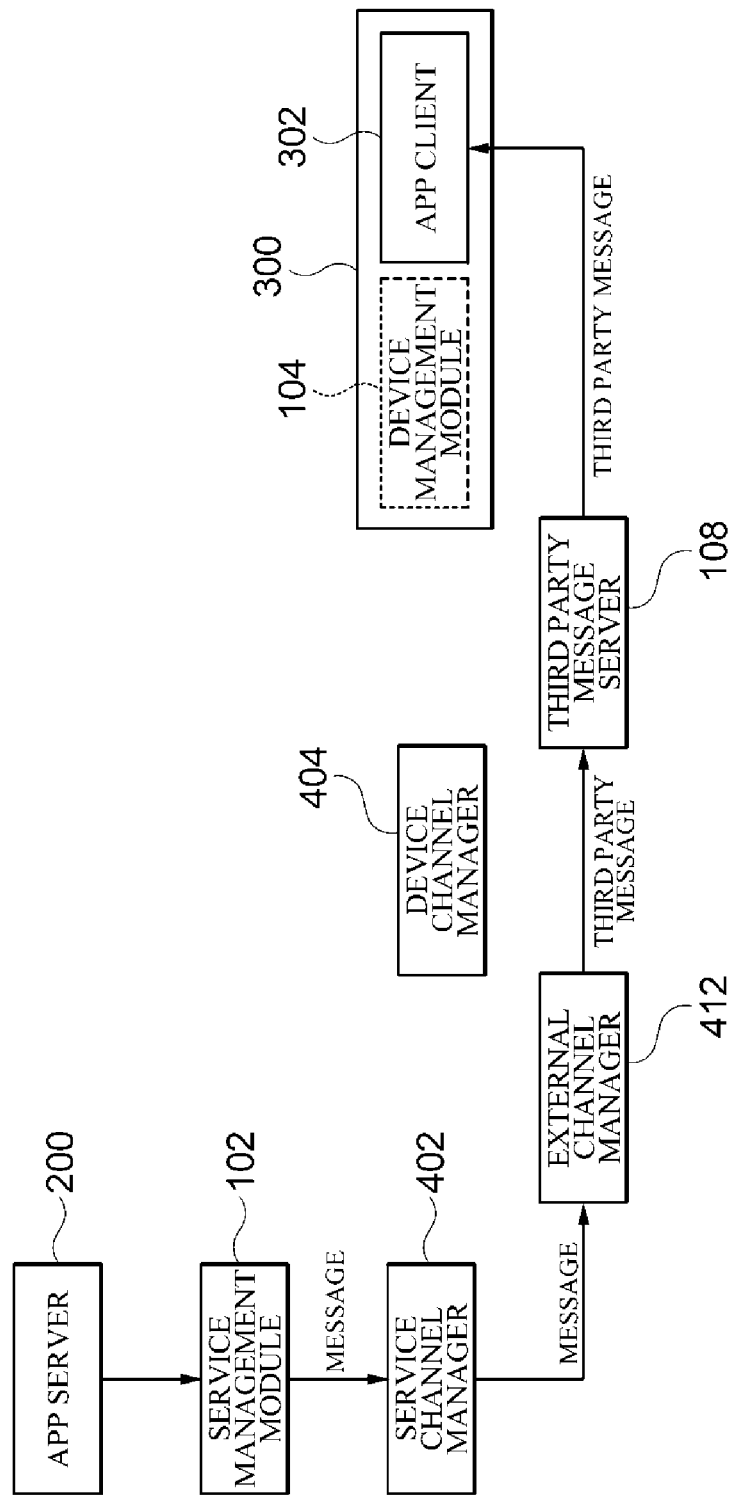
FIG. 7 is a diagram for describing a process of forwarding a message using the third party message server according to a second embodiment of the present disclosure.

FIG. 7 is a diagram for describing a process of forwarding a message using the third party message server 108 according to a second embodiment of the present disclosure.

Generally, a Mobile Device Management (MDM) agent of a device 300 using a specific operating system (e.g., iOS)

is not possible to be modified due to the characteristics of a corresponding platform and thus interlocking with the device management module 04 may be difficult. In this case, a method of forwarding a message related to an application service policy or the like to the corresponding device 300 without going through the device management module 104 is required, and as such a method, the third party message server 108 may be utilized.

Referring to FIG. 7, the service channel manager 402 may receive the message from the service management module 102 and forward the message to the external channel manager 412, rather than the device channel manager 404. The external channel manager 412 may convert the message into a third party message and directly forward the third party message to the application client 302 without going through the device management module 104. As described above, according to the embodiments of the present disclosure, when the device management module 104 is not available to be used, the message is directly transmitted to the application client 302 through the third party message server 108 so that the reliability of the message forwarded between a sender side and a receiver side can be ensured.

Figure 8:
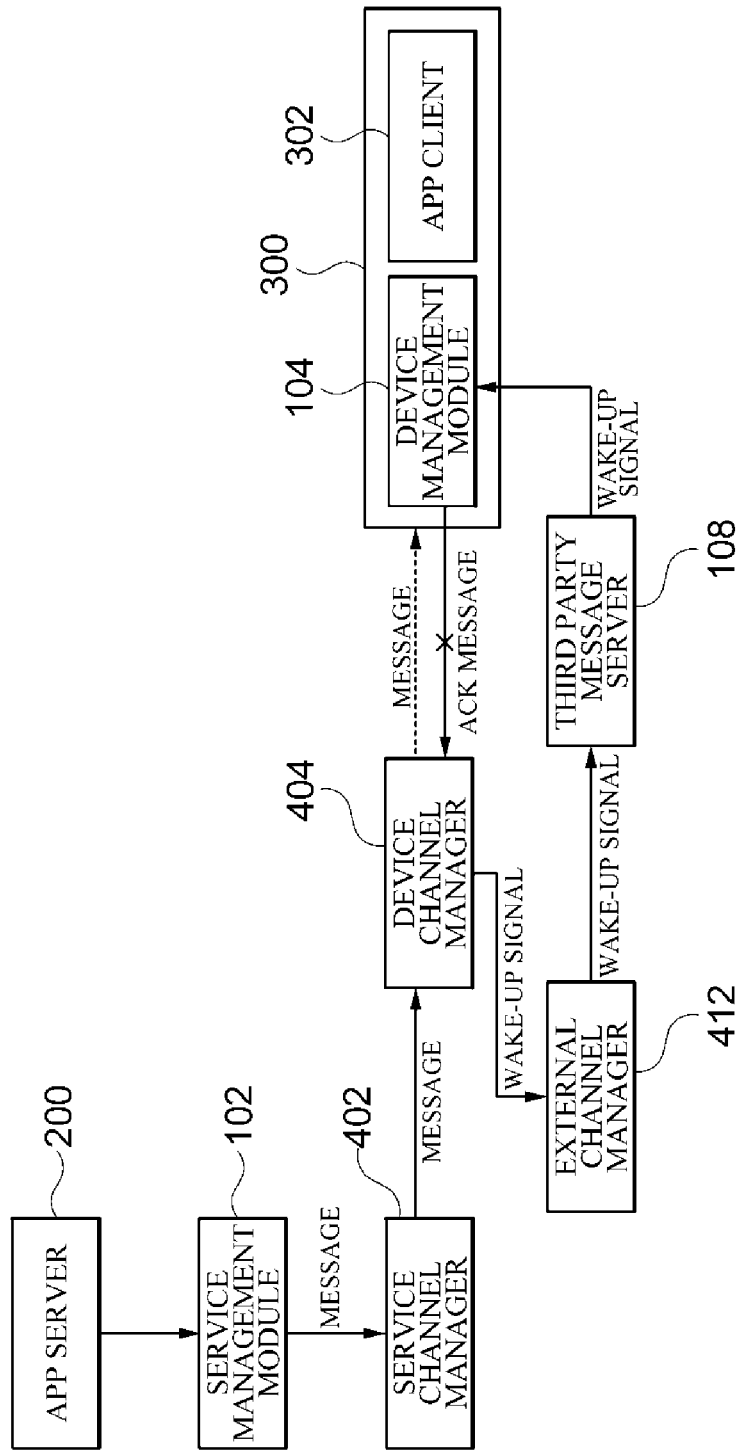
FIG. 8 is a diagram for describing a process of forwarding a message using the third party message server according to a third embodiment of the present disclosure.

FIG. 8 is a diagram for describing a process of forwarding a message using the third party message server 108 according to a third embodiment of the present disclosure. Here, it is assumed that the device management module 104 is operating all the time.

Referring to FIG. 8, the service channel manager 402 may receive a message from the service management module 102 and forward the message to the device channel manager 404. Then, the device channel manager 404 may forward the message to the device management module 104. However, when a connection between the device channel manager 404 and the device management module 104 is disconnected due to a problem of a network or the like, the device channel manager 404 cannot receive a reception acknowledgement message for the message. Accordingly, the device channel manager 404 may determine that the connection with the device management module 104 is disconnected and may transmit a wake-up signal to the external channel manager 412. The wake-up signal is an alarm signal that informs that the connection between the device channel manager 404 and the device management module 104 is disconnected, and may be transmitted to the device management module 104 through the external channel manager 412 and the third party message server 108. That is, the third party message server 108 may receive the wake-up signal from the external channel manager 412 and forward the wake-up signal to the device management module 104. As the device management module 104 receives the wake-up signal, the device management module 104 may confirm that the connection with the device channel manager 404 is disconnected and may attempt reconnection to the device channel manager 404. When the device management module 104 is reconnected to the device channel manager 404, the device management module 104 may re-transmit the same message to the device management module 104.

When the device management module 104 detects the disconnection to the device channel manager 404, the device management module 104 may attempt reconnection to the device channel manager 404, but when the disconnection is maintained without being detected, the device management module 104 cannot normally receive the message transmitted from the device channel manager 404. However, according to the embodiments of the present disclosure, even when the connection between the device channel manager 404 and the device management module 104 is disconnected, the wake-up signal is transmitted to the device management module 104 through the third party message server 108 to allow the device management module 104 to attempt reconnection to the device channel manager 404 so that the message from the device channel manager 404 can be normally transmitted to the device management module 104.

Figure 9:
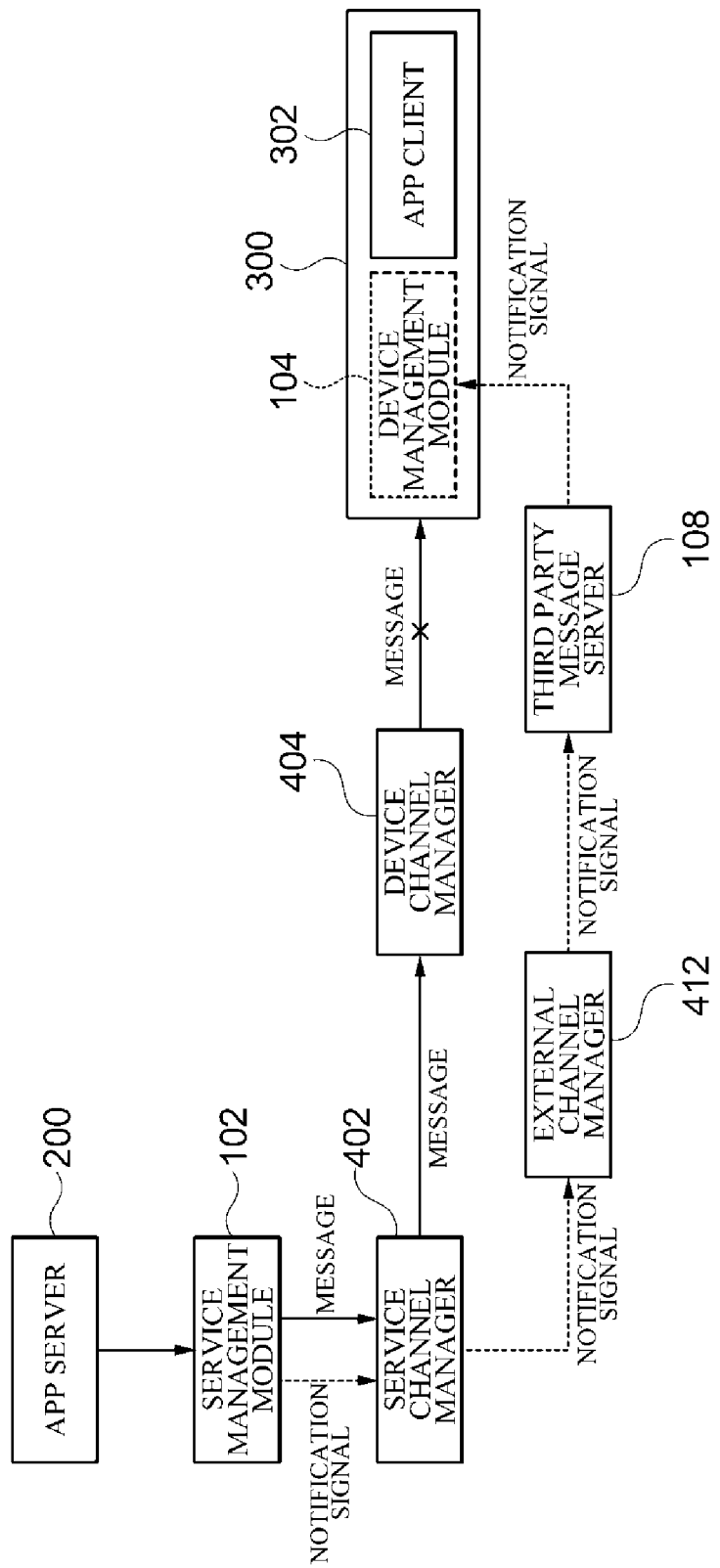
FIG. 9 is a diagram for describing a process of forwarding a message using the third party message server according to a fourth embodiment of the present disclosure.

FIG. 9 is a diagram for describing a process of forwarding a message using the third party message server 108 according to a fourth embodiment of the present disclosure. Here, it is assumed that the device management module 104 does not usually operate (i.e., is not connected to the device channel manager 404) since the device management module 104 communicates with the application client 302 by calling a function through a library (not shown).

Referring to FIG. 9, the service management module 102 may generate a message and a notification signal including additional information related to the message and may transmit the message and the notification signal to the service channel manager 402. Here, the additional information is information indicating the message, and may include, for example, title, subtitle, badge, and the like, which are shown in FIG. 6. The service channel manager 402 may transmit the message and the notification signal to the device channel manager 404 and the external channel manager 412, respectively. Then, the device channel manager 404 may attempt to forward the message to the device management module 104, but fails to normally forward the message to the device management module 104 since the device management module 104 is not connected to the device channel manager 404.

In addition, the external channel manager 412 receives the notification signal and transmits the same to the third party message server 108 and the third party message server 108 transmits the notification signal to the device management module 104. The device management module 104 may display the additional information included in the notification signal on, for example, a set notification bar, and a user may check the additional information and execute the device management module 104. Accordingly, the device management module 104 may be connected to the device channel manager 404 and be able to receive the message from the device channel manager 404. As described above, according to the embodiments of the present disclosure, when the device management module 104 is not connected to the device channel manager 404 and hence the message cannot be forwarded to the device management module 104, the notification signal is transmitted to the device management module 104 through the third party message server 108 to allow the device management module 104 to be executed so that the device management module 104 can be connected to the device channel manager 404 and accordingly the message can be normally forwarded.

As described above, the third party message server 108 may be utilized as an auxiliary means for waking up/executing the device management module 104. Further, the third party message server 108 may be used to cancel doze mode when the device enters into the doze mode. This will be described in detail hereinafter.

FIG. 10 is a table for describing doze mode according to one embodiment of the present disclosure. The doze mode is a power saving mode for efficiently increasing battery performance of a device, and in doze mode, the use of some functions is limited as compare to a normal mode.

Referring to FIG. 10, the normal mode may be a mode in which, for example, the device is connected to a charger or a sensor or a screen mounted in the device is being used. In this case, a central processing unit (CPU) of the device, a network communication, a timer, and the like can be normally used.

On the other hand, when the use of the device is not detected for more than a predetermined period of time or the screen remains off for more than a predetermined period of time in a state in which the device is not connected to the charger, the device may enter into doze mode. In this case, the CPU of the device can be used but the network communication, the timer, the like cannot be used.

In the doze mode, the device management module 104 cannot normally receive a message from the device channel manager 404. Thus, according to the embodiments of the present disclosure, the doze mode is cancelled through the third party message server 108 so that the device management module 104 can normally receive the message from the device channel manager 404.

Figure 11:
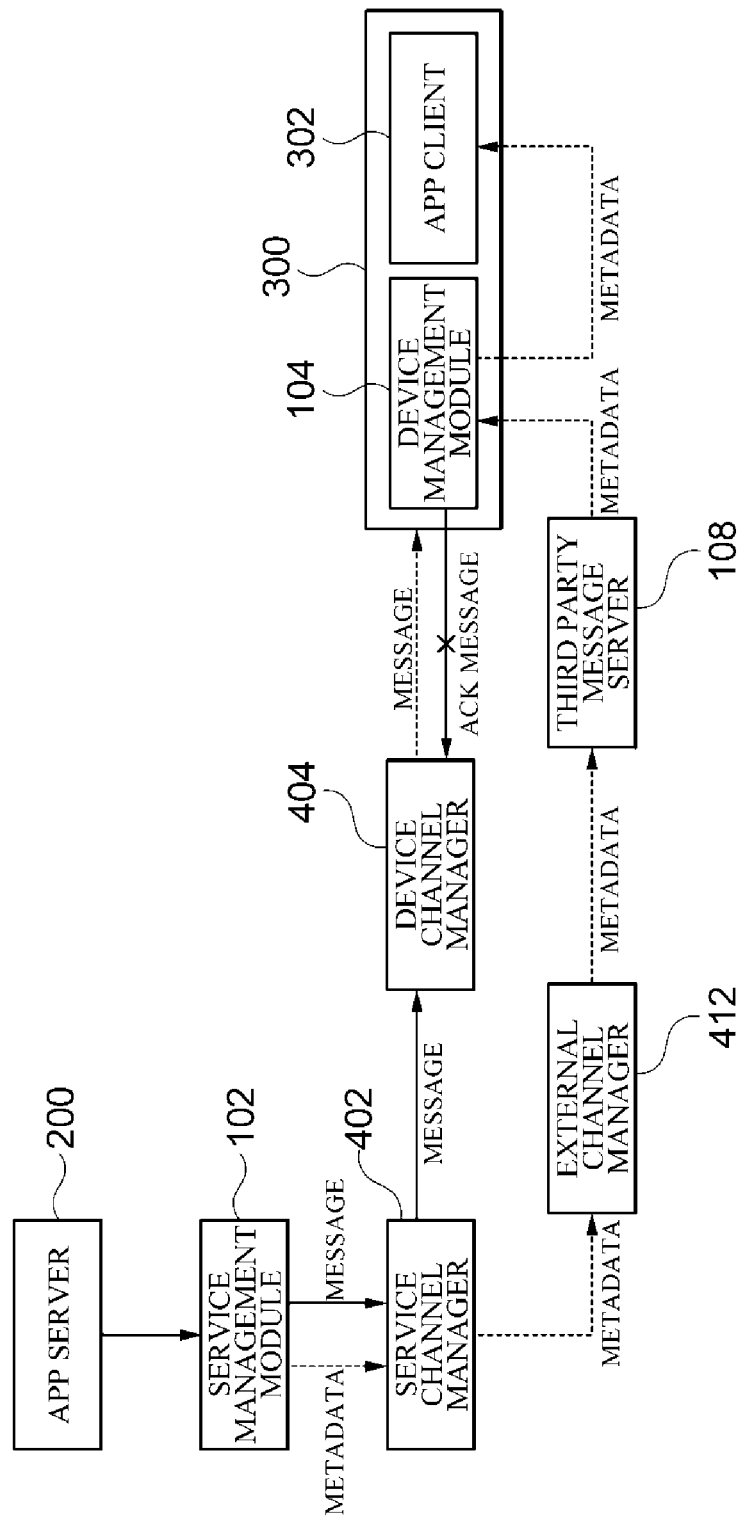
FIG. 11 is a diagram for describing a process of forwarding a message to a device through a third party message server according to one embodiment of the present disclosure when the device is in doze mode.
Figure 12:
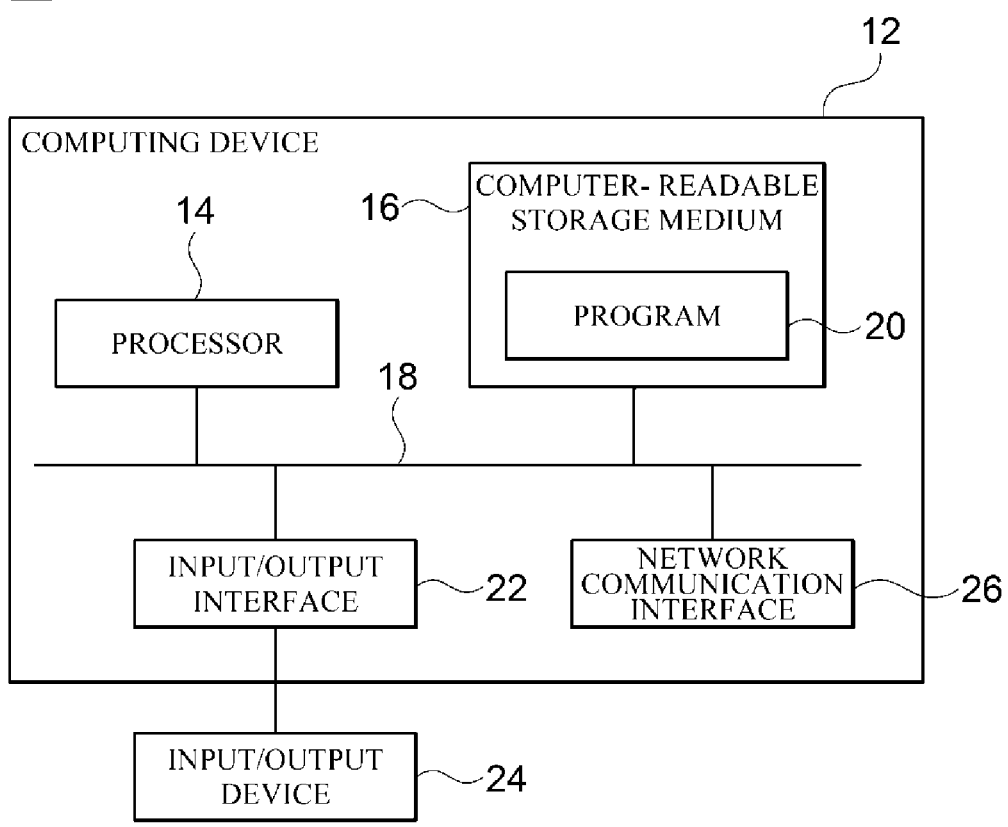
FIG. 12 is a block diagram illustrating an example of a computing environment including a computing device suitable to be used in exemplary embodiments.

FIG. 11 is a diagram for describing a process of forwarding a message to the device 300 through the third party message server according to one embodiment of the present disclosure 108 when the device 300 is in doze mode.

As described above, the service channel manager 402 may receive a message from the service management module 102 and forward the message to the device channel manager 404 and the device channel manager 404 may transmit the message to the device management module 104. However, when the device 300 enters into doze mode and the connection between the device management module 104 and the message server (i.e., the device channel manager 404) is disconnected, the message cannot be normally forwarded to the device management module 104 and the device channel manager 404 cannot receive a reception acknowledgement message for the message from the device management module 104.

When the service management module 102 fails to receive the reception acknowledgement message for the message from the device channel manager 404 within a predetermined period of time, the service management module 102 may generate metadata about the message and transmit the message, which is to be retransmitted, and the metadata to the service channel manager 402 at the first retransmission attempt. Here, the metadata data may be data indicating the message and may include information about, for example, an application service related to the message, and the like. In addition, the metadata may be in a set data format, and the size thereof may be, for example, less than 1 Kbyte.

The external channel manager 412 may receive the metadata from the service channel manager 402 and forward the metadata to the third party message server 108 (e.g., GCM) and the third party message server 108 may forward the metadata to the device management module 104. Here, it is assumed that a communication channel between the device management module 104 and the third party message server 108 is always open (i.e., the third party message server 108 and the device management module 104 are always connected to each other).

The device management module 104 may forward the metadata to the application client 302 and the application client 302 may perform a set operation for cancelling the doze mode in response to receiving the metadata. Here, the set operation may include, for example, an operation of turning on a screen of the device 300 or an operation of outputting sound from the device 300, and the like. In the doze mode, the CPU can be used, and thus the application client 302 may perform the above-described operation through the CPU and accordingly, the doze mode may be cancelled. As the doze mode is cancelled, the device management module 104 may be connected to the device channel manager 404 and receive the message from the device channel manager 404.

As described above, according to the embodiments of the present disclosure, when the device 300 enters into doze mode and thus message delivery is difficult, the metadata of the message is forwarded to the application client 302 through the third party message server 108, thereby allowing the doze mode to be cancelled, so that the device management module 104 can be connected to the device channel manager 404 and hence the message can be normally delivered.

According to the embodiments of the present disclosure, when the device management module is not available to be used, a message is directly delivered to the application client through the third party message server so that the reliability of the message forwarded between a sender side and a receiver side can be ensured.

In addition, according to the embodiments of the present disclosure, when a connection between the device channel manager and the device management module is disconnected, a wake-up signal is transmitted to the device management module through the third party message server to allow the device management module to attempt reconnection to the device channel manager so that the message from the device channel manager can be normally transmitted to the device management module.

Further, according to the embodiments of the present disclosure, when the device management module is not connected to the device channel manager and hence it is not possible to transmit the message to the device management module, a notification signal is transmitted to the device management module through the third party message server so that the device management module can be connected to the device channel manager and accordingly the message can be normally forwarded.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A message processing apparatus comprising:
a service management module residing on a side of an application server;
a device management module residing on a side of an application client, the application client being installed on a device to allow an application service provided by the application server to run on the device; and
a message server which is configured to relay a message related to the application service between the service management module and the device management module and is connected to one or more third party message servers,
wherein the message server comprises:
a plurality of service channel managers configured to relay the message on a side of the service management module;
a plurality of device channel managers configured to relay the message on a side of the device management module; and an external channel manager configured to convert the message into a third party message in a form capable of being processed by a third party message server and relay the third party message between the message server and a gateway connected to the third party message server, wherein, based on the device entering into a power saving mode and a connection between the device management module and the message server being disconnected, the service management module is configured to generate metadata about the message and transmit the metadata to a service channel manager, wherein the third party message server is configured to receive the metadata from the service channel manager via the external channel manager, and transmit the metadata to the device management module, and wherein the device management module is configured to transmit the metadata to the application client, upon which the power saving mode is cancelled in response to receiving the metadata at the application client.

2. The message processing apparatus of claim 1, wherein the third party message server is configured to receive the third party message from the external channel manager and forward the third party message to the application client through the device management module.

3. The message processing apparatus of claim 2, wherein the gateway is configured to determine a third party message server to which the third party message is forwarded among the one or more third party message servers according to a type of the third party message.

4. The message processing apparatus of claim 1, wherein the third party message server is configured to receive the third party message from the external channel manager and directly forward the third party message to the application client without going through the device management module.

5. The message processing apparatus of claim 1, wherein
a device channel manager is configured to transmit a wake-up signal to the external channel manager when it is determined that a connection to the device management module is disconnected,
the third party message server is configured to receive the wake-up signal from the external channel manager and transmit the wake-up signal to the device management module, and
the device management module is configured to attempt reconnection to the device channel manager in response to receiving the wake-up signal.

6. The message processing apparatus of claim 1, wherein the service management module is configured to generate the message and a notification signal including additional information related to the message and transmit the message and the notification signal to the service channel manager,
the service channel manager is configured to transmit the message and the notification signal to a device channel manager and the external channel manager, respectively,
the third party message server is configured to receive the notification signal from the external channel manager and forward the notification signal to the device management module, and
the device management module is connected to the device channel manager by being executed by a user in response to the notification signal and receives the message from the device channel manager.

7. A message server which relays a message related to an application service between a service management module residing on an application server side and a device management module residing on an application client side that is installed on a device and is connected to one or more third party message servers, the message server comprising:
a plurality of service channel managers configured to relay the message on a side of the service management module;
a plurality of device channel managers configured to relay the message on a side of the device management module; and
an external channel manager configured to convert the message into a third party message in a form capable of being processed by a third party message server and relay the third party message between the message server and a gateway connected to the third party message server,
wherein, based on the device entering into a power saving mode and a connection between the device management module and the message server being disconnected, a service channel manager is configured to receive metadata about the message from the service management module and transmit the metadata to the external channel manager, and
wherein the external channel manager is configured to transmit the metadata to the third party message server so that the metadata is transmitted to the application client, upon which the power saving mode is cancelled in response to receiving the metadata at the application client.

8. The message processing apparatus of claim 1, wherein the service management module is configured to transmit the metadata to the service channel manager at a first attempt to retransmit the message.

* * * * *